United States Patent
Favre et al.

(10) Patent No.: US 12,326,696 B2
(45) Date of Patent: Jun. 10, 2025

(54) DEVICE FOR DETERMINING THE POSITION OF A HOROLOGICAL DISPLAY

(71) Applicant: The Swatch Group Research and Development Ltd, Marin (CH)

(72) Inventors: Jérôme Favre, Neuchatel (CH); Stefan Kalbermatter, Grenchen (CH); Hicham Farah, Sonceboz-Sombeval (CH)

(73) Assignee: The Swatch Group Research and Development Ltd, Marin (CH)

( * ) Notice: Subject to any disclaimer, the term of this patent is extended or adjusted under 35 U.S.C. 154(b) by 523 days.

(21) Appl. No.: 17/319,144

(22) Filed: May 13, 2021

(65) Prior Publication Data
US 2022/0113676 A1   Apr. 14, 2022

(30) Foreign Application Priority Data
Oct. 14, 2020   (EP) ..................... 20201841

(51) Int. Cl.
*G04B 9/00* (2006.01)
*H04N 13/204* (2018.01)
(52) U.S. Cl.
CPC ........... *G04B 9/005* (2013.01); *H04N 13/204* (2018.05)
(58) Field of Classification Search
CPC .............................. H04N 13/204; G03B 35/00
See application file for complete search history.

(56) References Cited

U.S. PATENT DOCUMENTS

| 4,611,923 | A | 9/1986 | Kawahara | |
|---|---|---|---|---|
| 10,095,189 | B2 * | 10/2018 | Masserot | ................ G04G 5/00 |
| 2005/0105401 | A1 | 5/2005 | Akahane et al. | |
| 2019/0049904 | A1 | 2/2019 | Lagorgette et al. | |

(Continued)

FOREIGN PATENT DOCUMENTS

| CN | 1490685 A | 4/2004 |
|---|---|---|
| CN | 102169322 B | 8/2011 |
| CN | 104813240 B | 7/2015 |

(Continued)

OTHER PUBLICATIONS

Wikipedia, Stereo Camera, Jun. 2, 2019.*

(Continued)

*Primary Examiner* — Renee S Luebke
*Assistant Examiner* — Matthew Hwang
(74) *Attorney, Agent, or Firm* — Oblon, McClelland, Maier & Neustadt, L.L.P.

(57) ABSTRACT

A device for determining a position of a horological display, the device including a control device coordinating a time base, a shape recognition device, and an optical acquisition device. The control device identifies the display and monitors its travel in order to code its instantaneous position in relation to a fixed guide-mark, and controls entries of its position at distinct instants in time to determine its mobility in relation to the fixed guide-mark. The device includes a device for determining the depth position of the display in relation to the fixed guide-mark, a device for controlling the position of the optical acquisition device, a device for controlling a focus of the optical acquisition device, and an additional optical acquisition device coupled with the optical acquisition device to interferentially monitor the display.

10 Claims, 2 Drawing Sheets

(56) References Cited

U.S. PATENT DOCUMENTS

2019/0121297 A1     4/2019   Buehler et al.
2019/0307397 A1     10/2019   Garinaud

FOREIGN PATENT DOCUMENTS

| | | |
|---|---|---|
| CN | 108139115 B | 6/2018 |
| CN | 111025877 B | 4/2020 |
| EP | 0 183 434 B1 | 6/1986 |
| EP | 1 396 767 B1 | 3/2004 |
| EP | 1 553 469 A1 | 7/2005 |
| EP | 3 211 491 A1 | 8/2017 |
| EP | 3 579 061 A1 | 12/2019 |
| WO | WO 2018/007978 A1 | 1/2018 |

OTHER PUBLICATIONS

European Search Report issued Feb. 24, 2021 in European Application 20201841.2 filed on Oct. 14, 2020, 3 pages (with English Translation of Categories of Cited Documents).

Office Action issued Feb. 21, 2024, in Chinese Patent Application No. 202110784205.3, with English-language Translation.

\* cited by examiner

DEVICE FOR DETERMINING THE POSITION OF A HOROLOGICAL DISPLAY

CROSS-REFERENCE TO RELATED APPLICATION

This application claims priority to European Patent Application No. 20201841.2 filed on Oct. 14, 2020, the entire disclosure of which is hereby incorporated herein by reference.

FIELD OF THE INVENTION

The invention relates to a device for determining the position of a horological display, for determining the instantaneous position of at least one display of a timepiece, including control means coordinating a time base and shape recognition means and optical acquisition means, that said device includes, arranged to identify said at least one display and monitor its travel in order to code its instantaneous position in relation to a fixed guide-mark, and controlling entries of its position at distinct instants in order to determine its mobility in relation to said fixed guide-mark.

The invention also relates to an automatic winding-mechanism for watch, including at least one such device for determining the position of such a horological display.

The invention also relates to an apparatus for adjusting the rate, and/or state of a watch, including such an automatic winding-mechanism, and/or at least one such device for determining the position of a horological display.

The invention relates to the field of maintenance equipment for timepieces, particularly watches, and in particular the field of automatic winding-mechanisms.

BACKGROUND OF THE INVENTION

Document EP3572887 in the name of THE SWATCH GROUP RESEARCH & DEVELOPMENT Ltd describes a smart winding-mechanism, implementing a viewing system such as a camera, for observing at least one watch during its winding. This solution makes it possible to implement an algorithm for reading the time by recognition of the hands, which is functional, but requires a programming specific to each configuration of displays, particularly of hands, and of dials. The sensitivity to the shooting parameters is relatively high, and the reliability of the reading may be rendered difficult for watches of which at least one dial is highly decorated, and/or of which the displays, particularly hands, may blend into the decoration of such a dial. For example, a reading difficulty arises with a dial with striped pattern, of which certain stripes may greatly resemble a second hand.

The algorithm used is also based on the movement of the hands in order to distinguish them from the dial. This method works relatively well for the second and minute hands, however the hour hand moves so slowly that it would be necessary to wait a very long time to obtain useable information. Although possible, the recognition of the hour hand is consequently not currently implemented.

A universal recognition algorithm may constitute a solution, however, its development requires taking into account a very wide variety of display configurations.

SUMMARY OF THE INVENTION

The invention proposes to improve the visual distinction of the hands of a watch in relation to the dial. In particular, the invention implements a detection of the hands by stereoscopy.

To this end, the invention relates to a device for determining the position of a horological display according to claim 1.

The invention also relates to an automatic winding-mechanism for watch, including at least one such device for determining the position of such a horological display.

The invention also relates to an apparatus for adjusting the rate, and/or state of a watch, including such an automatic winding-mechanism, and/or at least one such device for determining the position of a horological display.

BRIEF DESCRIPTION OF THE DRAWINGS

Other features and advantages of the invention will become apparent upon reading the following detailed description, with reference to the appended drawings, where.

DETAILED DESCRIPTION OF PREFERRED EMBODIMENTS

The invention proposes to improve the visual distinction of the displays, and in particular of the hands, of a watch in relation to the dial or to the dials if the watch includes a plurality thereof.

The present description more particularly discloses the non-limiting case where these displays are hands.

The invention implements means for increasing the amount of available information, in particular by adding depth information. Indeed, in almost all cases, the hands are located above the dial of the watch.

This involves distinguishing the closest elements of the viewing system, particularly a camera or similar, from those that are the furthest away therefrom, in particular the dial or the dials. This information is injected into the algorithm and thus makes it possible to very significantly improve the detection probabilities.

Many different methods exist that theoretically make it possible to obtain depth information, for example and not limited to:

- the use of a plurality of photographic apparatuses, particularly a plurality of cameras, for performing stereoscopic shots;
- the variation of the distance between the photographic apparatus, particularly a camera, and the watch;
- the variation of the focus of the photographic apparatus, particularly a camera;
- the variation of position of an illumination that makes it possible to move the projected shadow of the hands on the dial.

These various methods may even be combined, however at the expense of a greater processing complexity.

The method for varying the distance, like the method for varying the focus, requires a very expensive and cumbersome optic, because the latter must have a very low depth of field, and therefore a wide aperture and a long focal length.

Consequently, the preferred embodiment, due to the moderate cost of the necessary equipment, is the use of stereoscopy, by simply adding a second photographic apparatus, particularly a camera, off-axis of the watch; one of the photographic apparatuses, particularly a camera, preferably remains in the axis, so as to minimise the parallax effects when the hands will have been distinguished from the dial.

One variant consists in using an illumination the activation or the orientation of which may be varied, making it possible to move the shadow projected by the hands on the dial. This variant makes it possible to have only one single photographic apparatus while remaining relatively simple. The optical processing of the shadow makes it possible to identify the display concerned, and to determine its position without ambiguity.

The detection of the hour hand is therefore greatly simplified, even if this hour hand seems immobile.

Figure 1:
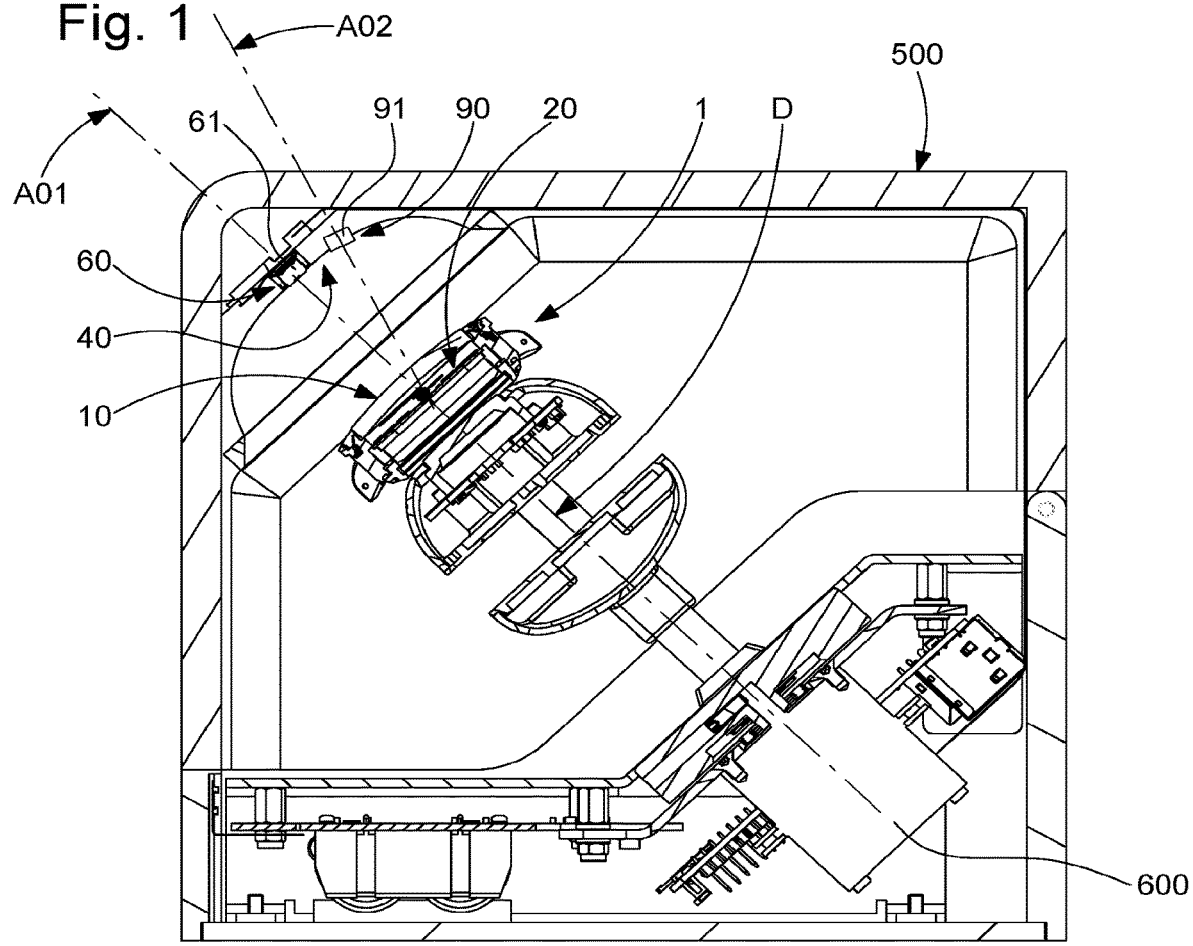
FIG. 1 shows, schematically, and in sectional view, an automatic winding-mechanism for watch, including a device for determining the position of a display according to the invention.
Figure 2:
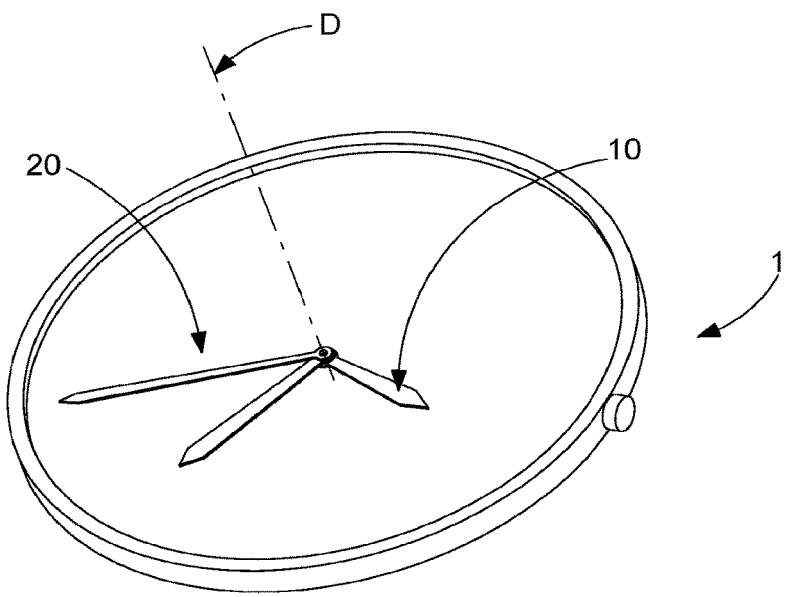
FIG. 2 shows, schematically, and in perspective view, a watch with its dial that constitutes a fixed guide-mark for the displays that sit on top of it, consisting of hands.
Figure 3:
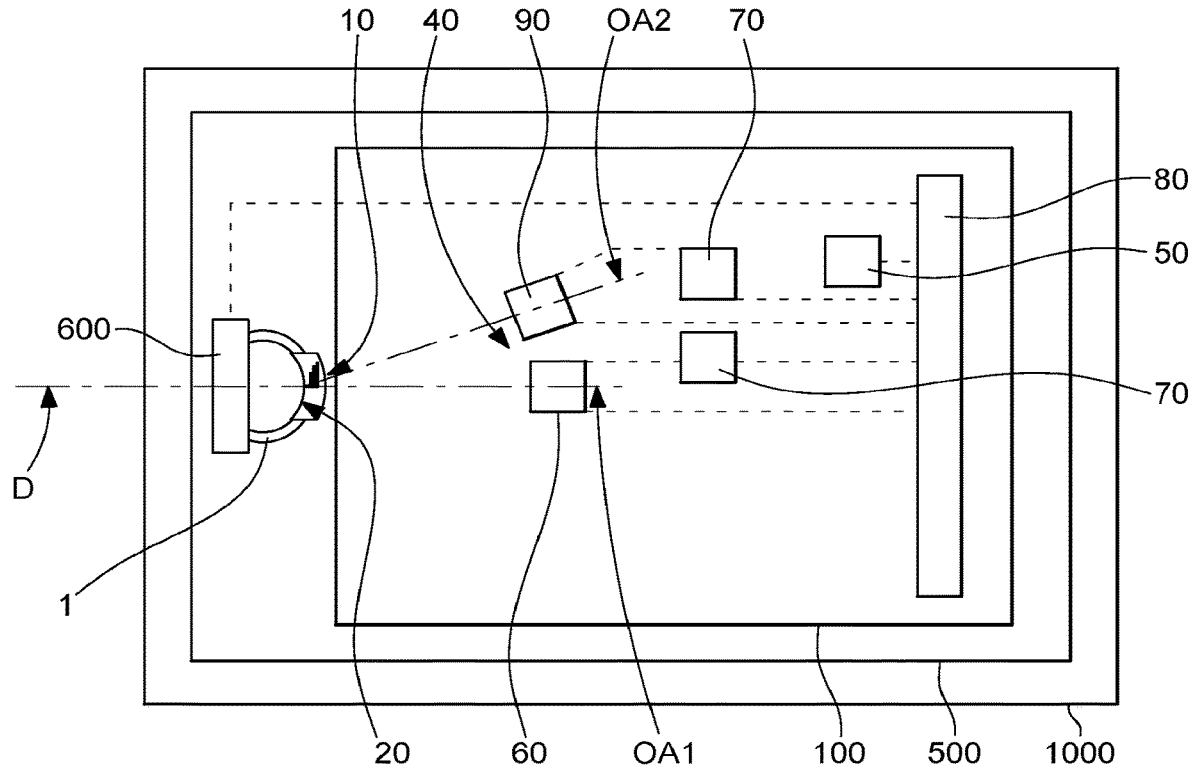
FIG. 3 is a block diagram, which shows a device for adjusting the rate and/or state of a watch, including an automatic winding-mechanism according to FIG. 1, itself including such a device for determining the position of a display.
Figure 4:
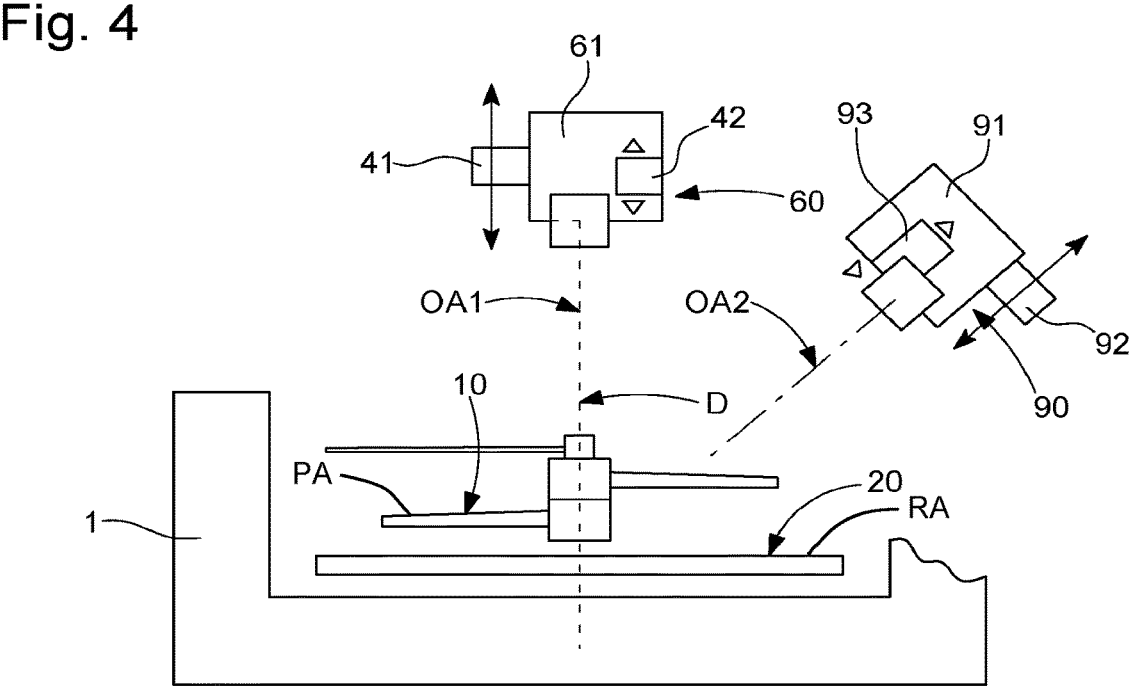
FIG. 4 is, in sectional view, a detail of FIG. 1.

FIG. 1 illustrates a sectional view of a winding-mechanism thus including two cameras for observing the display of a watch.

More particularly, the invention thus relates to a device for determining the position of a horological display 100, for determining the instantaneous position of at least one such display 10, in particular a hand, of a timepiece, in particular of a watch 1.

This device 100 includes control means 80, which are arranged to coordinate a reference time base 50 and shape recognition means 70 and optical acquisition means 60, that this device 100 includes, in order to on the one hand identify a particular display 10, by distinguishing it from other displays of the timepiece, and on the other hand monitor its travel, in order to code its instantaneous position in relation to a fixed guide-mark 20 in relation to which this display 10 is moveable, and more particularly but not limited to in front of which this display 10 is moveable.

These control means 80 are arranged to control entries of the position of a given display 10 at distinct instants, in order to determine its mobility in relation to the fixed guide-mark 20 that is associated with this display. This makes it possible to identify a slow display, like an hour hand, or a moon indicator, or calendar, or similar, in relation to the static elements of the timepiece, even if the visual contrast makes it difficult to identify it with the naked eye.

According to the invention, these control means 80 include depth position determination means 40 for the depth determination of the plane PA of the display 10 in relation to the plane PR of the fixed guide-mark 20.

These depth position determination means 40 may be arranged in various ways, according to various variants that may be combined.

In one micrometric variant, these depth position determination means 40 include means for controlling the position 41 of the optical acquisition means 60 in relation to the fixed guide-mark 20.

In one focus variant, these depth position determination means 40 include means for controlling the focus 42 of the optical acquisition means 60 in relation to the display 10.

In one stereoscopic variant, these depth position determination means 40 include at least additional optical acquisition means 90 that are coupled with the optical acquisition means 60 in order to monitor the same display 10 and define its position in space by interferential determination. Thus, the exact position in space of a display 10 is determined by interferential determination of the signals transmitted to the control means 80 by the additional optical acquisition means 90 and the optical acquisition means 60.

In one kinematic variant, these depth position determination means 40 include means for illuminating at least one display 10, which are arranged to project its shadow on a fixed surface in relation to which these illumination means have a variable incidence and/or a variable position, controlled by the control means 80 in order to move the projected shadow that is recognised by the shape recognition means 70 for the determination of said display 10 and of its movement. The variable incidence may be replaced or completed by a mobility, particularly flat or linear or circular, of illumination sources, capable of moving the projected shadow.

Generally, this at least one display 10 is moveable, during its travel, in a display plane PA in relation to a fixed guide-mark 20 including reference display means 30. These reference display means 30 include at least one location index and/or at least one location scale.

The optical acquisition means 60 are thus coupled with this reference time base 50, and preferably are capable of monitoring at least one display 10 over its entire travel, and more particularly are capable of monitoring each display of the same timepiece over its entire travel.

The shape recognition means 70, which are interfaced with each of the optical acquisition means 60, are capable of recognising and distinguishing the shape of each display 10.

Thus the control means 80, which are interfaced with the time base 50 and with each of the optical acquisition means 60, and with the shape recognition means 70, are arranged to determine the relative position of each display 10 in relation to the associated fixed guide-mark 20, at an instant identified in relation to the time base 50.

More particularly, each of the optical acquisition means 60, including particularly but not limited to a first camera 61, is arranged to carry out a substantially frontal image entry in relation to the display plane PA wherein the display 10 considered is moveable.

It is understood that the same material support like a camera may include both the shape recognition means 70 and the optical acquisition means 60.

The depth position determination means 40 are arranged to determine the depth position of the display plane PA in relation to a reference plane PR of the fixed guide-mark 20 with which the display plane PA is parallel, perpendicular to the reference plane PR, so as to ensure the exact identification of a particular display 10.

More particularly, the means for determining the depth position 40 include at least additional optical acquisition means 90, which are coupled with optical acquisition means 60 for the monitoring of the same display 10, and which are arranged to carry out an oblique or transverse image entry in relation to the display plane PA wherein this display 10 is moveable, to determine the depth position of the display plane PA in relation to a reference plane PR of the fixed guide-mark 20 with which the display plane PA is parallel, perpendicular to the reference plane PR, for the confirmation of the correct identification of the display 10, and for the improvement of the entry of its position. These additional optical acquisition means 90 may in particular include a second camera 91, and, if the optical acquisition means 60 also include a first camera 61, the optical axes OA1 and OA2 of these two cameras 61 and 91 do not coincide, and preferably are not parallel.

Naturally, the additional optical acquisition means 90 may include means for controlling their position 92 and/or means for controlling their focus 93, just like for the optical acquisition means 60.

More particularly, these additional optical acquisition means 90 and the optical acquisition means 60 with which they are coupled for the monitoring of the same display 10 are arranged for a stereoscopic shot.

This device 100 is particularly arranged to determine the instantaneous position, at the same instant, of each display 10 of the same timepiece, in particular of a watch.

More particularly, these at least additional optical acquisition means 90 and the optical acquisition means 60 are, in projection over the reference plane PR, disposed at a distance from one another.

More particularly, the optical acquisition means 60 includes an optical axis OA1 that is centred on the axis of rotation D of the display 10, when the display 10 is a rotary display.

More particularly, when the display 10 is a display moveable by periodic jumps, the control means 80 are arranged to control the entries of the position of the display 10 at instants that are separated by a duration greater than the period of the jump.

More particularly, the optical acquisition means 60 is moveable in relation to the fixed guide-mark 20, at least in distance.

More particularly, the optical acquisition means 60 includes at least one camera with an auto-focus device for its automatic focusing.

The invention also relates to an automatic winding-mechanism for watch 500, including at least one such device for determining the position of a horological display 100. This winding-mechanism 500 conventionally includes motorisation means 600, arranged to move the watch 1, for example and not limited to about the axis D that is that of the display and also that of an automatic device.

The invention also relates to an apparatus for adjusting the rate, and/or state of a watch 1000, including such an automatic winding-mechanism 500, and/or at least one such device for determining the position of a horological display 100. This apparatus for adjusting the rate and/or state of a watch 1000 is particularly achievable according to the information from documents EP3401235 (rate adjustment) and EP3410236 (state correction) in the name of THE SWATCH GROUP RESEARCH & DEVELOPMENT Ltd.

The invention claimed is:

1. A method for determining an instantaneous position of a display hand of a timepiece, the method comprising:
   controlling a first camera and a second camera to identify the display hand, and monitor movement of the display hand so as to code the instantaneous position of the display hand in relation to a fixed guide-mark, and controlling entries of the instantaneous position at distinct instants to determine mobility of the display hand in relation to the fixed guide-mark, wherein the controlling further comprises:
   controlling a position of the first camera and a position of the second camera, in relation to the fixed guide-mark, wherein the second camera and the first camera are, in projection over a plane of the fixed guide-mark, disposed at a distance from one another for stereoscopic imaging,
   controlling a focus of the first camera and a focus of the second camera, in relation to the display hand,
   determining a depth position of a plane of the display hand in relation to the plane of the fixed guide-mark by controlling the position of the first camera in relation to the plane of the fixed guide-mark, controlling the second camera coupled with the first camera and determining the depth position of the display hand by stereoscopic vision, and
   monitoring, by the first camera and the second camera, the display hand and determining the instantaneous position of the display hand in space from signals obtained from the first and second cameras.

2. The method according to claim 1, wherein the display hand is moveable in the plane of the display hand in relation to the fixed guide-mark, which includes a location index and/or a location scale,
   wherein the method further comprises determining a relative position of the display hand in relation to the fixed guide-mark associated with a particular instant identified in relation to a time base,
   wherein the method further comprises controlling, at the distinct instants, entries of the instantaneous position of the display hand and comparing the instantaneous positions with the distinct instants to determine the movement of the display hand in relation to the associated fixed guide-mark,
   wherein the first camera is arranged to perform a substantially frontal image entry in relation to the plane of the display hand in which the display hand is moveable, and
   wherein, to ensure an identification of the display hand, the method further comprises determining the depth position of the plane of the display hand in relation to the plane of the fixed guide-mark with which the plane of the display hand is parallel, the depth position being perpendicular to the plane of the fixed guide-mark.

3. The method according to claim 1, further comprising performing an oblique or transverse image entry in relation to the plane of the display hand, wherein the display hand is moveable, to determine the depth position of the plane of the display hand in relation to the plane of the fixed guide-mark with which the plane of the display hand is parallel, the depth position being perpendicular to the plane of the fixed guide-mark, so as to confirm a correct identification of the display hand and to improve each entry of the position of the display hand.

4. The method according to claim 1, wherein the first camera is centered on an axis of rotation of the display hand when the display hand is a rotary display hand.

5. The method according to claim 1, wherein, the display hand is moveable by periodic jumps, and the distinct instants are separated by a duration greater than a period of the jumps.

6. The method according to claim 1, wherein the first camera is moveable in relation to the fixed guide-mark, at least in distance.

7. The method according to claim 1, wherein the first camera includes an auto-focus device for automatic focusing.

8. The method according to claim 1, further comprising determining the instantaneous position, at a same instant, of the display hand and another display hand of the timepiece.

9. A method for determining an instantaneous position of a display hand of a timepiece, the method comprising:
   controlling a camera to identify the display hand, and monitor movement of the display hand so as to code the instantaneous position of the display hand in relation to a fixed guide-mark, and controlling entries of the instantaneous position at distinct instants to determine mobility of the display hand in relation to the fixed guide-mark, wherein the controlling further comprises:

controlling a position of the camera in relation to the fixed guide-mark, controlling a focus of the camera in relation to the display hand, illuminating the display hand so as to project a shadow on a fixed surface in relation to which an illumination source has a variable incidence and/or a variable position, wherein the method further comprises:

capturing, with the camera, a first image of the shadow with the illumination source at a first illumination position, determining a first position of the shadow with respect to the fixed guide-mark using the captured first image, capturing, with the camera, a second image of the shadow with the illumination source at a second illumination position different from the first illumination position, determining a second position of the shadow with respect to the fixed guide-mark using the captured second image, and determining the instantaneous position of the display hand based on the first position of the shadow, the second position of the shadow, the first illumination position, and the second illumination position.

10. A method for determining an instantaneous position of a display hand of a timepiece, the method comprising:

controlling a first camera and a second camera to identify the display hand, and monitor movement of the display hand so as to code the instantaneous position of the display hand in relation to a fixed guide-mark, and controlling entries of the instantaneous position at distinct instants to determine mobility of the display hand in relation to the fixed guide-mark, wherein the controlling further comprises:

controlling a position of the first camera and a position of the second camera, in relation to the fixed guide-mark, controlling a focus of the first camera and a focus of the second camera, in relation to the display band, determining a depth position of a plane of the display hand in relation to a plane of the fixed guide-mark, by performing an oblique or transverse image entry in relation to the plane of the display hand, wherein the display hand is moveable, to determine the depth position of the plane of the display hand in relation to the plane of the fixed guide-mark with which the plane of the display hand is parallel, the depth position being perpendicular to the plane of the fixed guide-mark, so as to confirm a correct identification of the display hand and to improve each entry of the position of the display hand, and monitoring, by the first camera and the second camera, the display hand and determining the instantaneous position of the display hand in space from signals obtained from the first and second cameras.

* * * * *